US012507613B2

(12) United States Patent
Weihl

(10) Patent No.: US 12,507,613 B2
(45) Date of Patent: Dec. 30, 2025

(54) RIDING VEHICLE FOR DISTRIBUTING MATERIAL

(71) Applicant: Ricky A. Weihl, Muskegon, MI (US)

(72) Inventor: Ricky A. Weihl, Muskegon, MI (US)

( * ) Notice: Subject to any disclaimer, the term of this patent is extended or adjusted under 35 U.S.C. 154(b) by 939 days.

(21) Appl. No.: 17/208,215

(22) Filed: Mar. 22, 2021

(65) Prior Publication Data
US 2021/0298224 A1     Sep. 30, 2021

Related U.S. Application Data

(60) Provisional application No. 62/994,496, filed on Mar. 25, 2020.

(51) Int. Cl.
| | |
|---|---|
| *A01C 7/08* | (2006.01) |
| *A01C 3/06* | (2006.01) |
| *A01C 21/00* | (2006.01) |
| *A01C 23/04* | (2006.01) |

(52) U.S. Cl.
CPC .............. *A01C 7/085* (2013.01); *A01C 3/066* (2013.01); *A01C 21/00* (2013.01); *A01C 23/04* (2013.01)

(58) Field of Classification Search
CPC ......... A01C 7/085; A01C 3/066; A01C 21/00; A01C 23/04

USPC .... 239/670, 674, 675, 681, 684, 687, 77, 78
See application file for complete search history.

(56) References Cited

U.S. PATENT DOCUMENTS

| | | | |
|---|---|---|---|
| 3,349,970 A | 10/1967 | Daneman | |
| 4,712,717 A | 12/1987 | Egerdahl | |
| 5,098,018 A * | 3/1992 | Hadar | .................. A01M 7/0064 |
| | | | 239/176 |
| 9,661,801 B2 | 5/2017 | Bastin et al. | |
| 9,661,837 B2 | 5/2017 | Bastsin et al. | |

FOREIGN PATENT DOCUMENTS

| | | |
|---|---|---|
| CN | 107079648 | 8/2017 |
| CN | 107615965 | 1/2018 |
| DE | 1 757 070 A1 | 5/1971 |

* cited by examiner

*Primary Examiner* — Christopher S Kim
(74) *Attorney, Agent, or Firm* — Warner Norcross + Judd LLP

(57) ABSTRACT

A system and method for a vehicle in the form of a material spreader capable of distributing material over a ground surface. As an example, the material spreader may distribute granular materials, such as fertilizer, over the ground surface. The material spreader may include a material holder having a center of mass that is low to the ground surface, lowering the overall center of mass of the material spreader and providing enhanced stability for the material spreader.

13 Claims, 5 Drawing Sheets

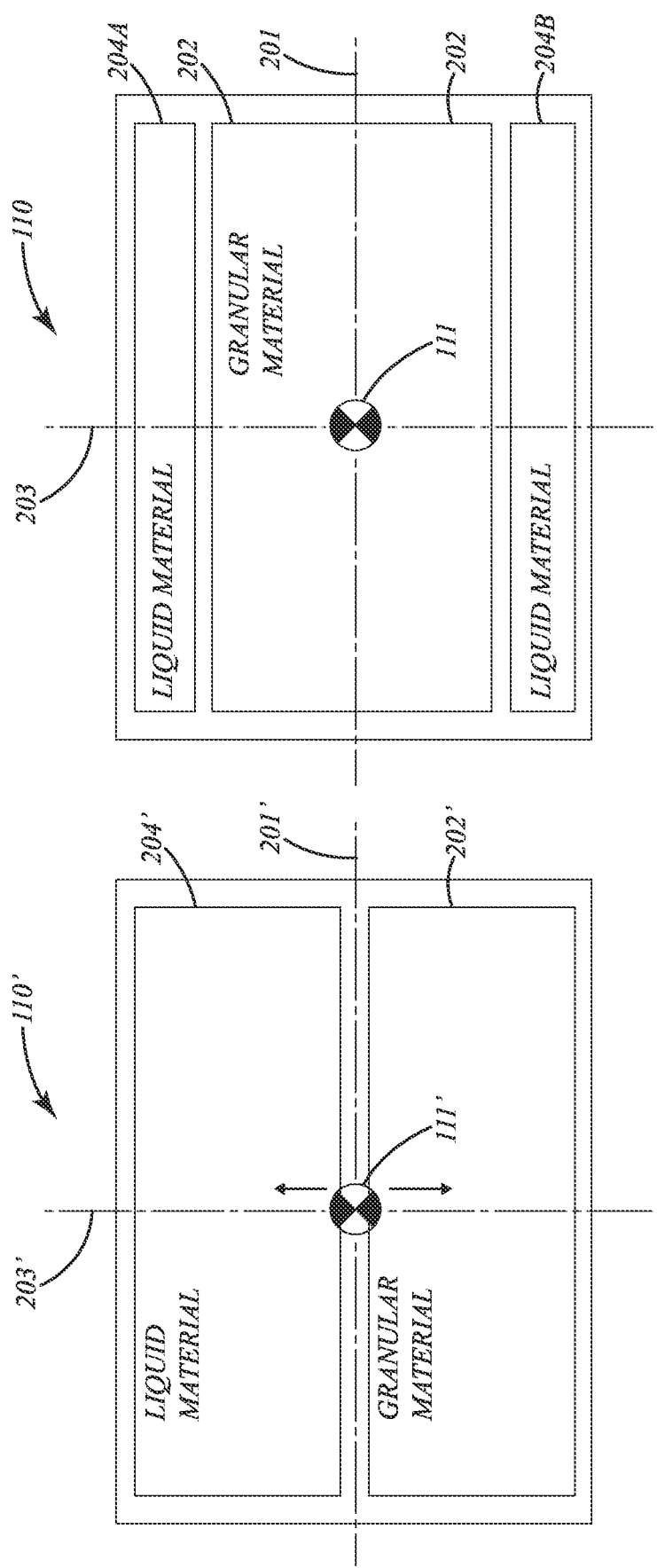

RIDING VEHICLE FOR DISTRIBUTING MATERIAL

TECHNICAL FIELD

The present application relates to a material spreader, and more particularly to a material spreader having enhanced stability.

BACKGROUND

There are a variety of conventional material spreaders in the marketplace that are capable of distributing material over a lawn or field. Such conventional spreaders include a hopper capable of holding material, such as fertilizer. The bottom of the hopper may include an opening through which material may be allowed to flow in response to the force of gravity toward a rotating broadcast spreader. The hopper is disposed above the rotational axes of the wheels in this conventional type of material spreader in order to provide space for the broadcast spreader beneath the hopper. As a result, when the hopper is fully loaded with material, the center of gravity of the hopper can be sufficiently distant from the ground surface to adversely affect overall stability of the material spreader.

SUMMARY OF THE DESCRIPTION

The present disclosure is directed to a system and method for a vehicle in the form of a material spreader capable of distributing material over a ground surface. As an example, the material spreader may distribute granular materials, such as fertilizer, over the ground surface. The material spreader may include a material holder having a center of mass that is low to the ground surface, lowering the overall center of mass of the material spreader and providing enhanced stability for the material spreader.

In one embodiment, a material spreader for distributing material over a ground surface is provided. The material spreader may include a frame coupled to a riding platform adapted to support a user. The material spreader may include a plurality of wheels coupled to the frame, the plurality of wheels including at least two traction wheels operable to move the material spreader along the ground surface. The plurality of wheels may include first and second front wheels coupled to a forward portion of the frame, and first and second rear wheels coupled to a rearward portion of the frame.

The material spreader may include a power source having an output shaft operable to transmit power to one or more components of the material spreader.

The material spreader in one embodiment may include a material holder capable of storing material, where the material holder has a center of mass that is disposed between the forward portion and the rearward portion of the frame, and where the center of mass of the material holder being closer to the ground surface than a center of mass of the material spreader.

The material spreader may include a material distributor operable to direct material toward the ground surface, where the material distributor is height adjustable to facilitate adjusting a distribution area of material.

The material spreader may include a material transfer system operably coupled to the material holder and the material distributor. The material transfer system may be configured to transfer material from the material holder to the material distributor.

In one embodiment, a method of distributing material over a ground surface is provided. The method may include providing a material spreader having a frame coupled to a riding platform that is adapted to support a user, and providing a material holder capable of storing material, wherein the material holder has a center of mass that is disposed between a forward portion of the frame and a rearward portion of the frame, where the center of mass of the material holder is closer to the ground surface than a center of mass of the material spreader.

The method may involve moving material from the material holder to a material distributor, and directing, via the material distributor, material toward the ground surface. A height of the material distributor may be adjusted.

These and other advantages and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 3 shows a material holder in accordance with one embodiment.

FIG. 4 shows a material holder in accordance with one embodiment.

DESCRIPTION

Figure 1:
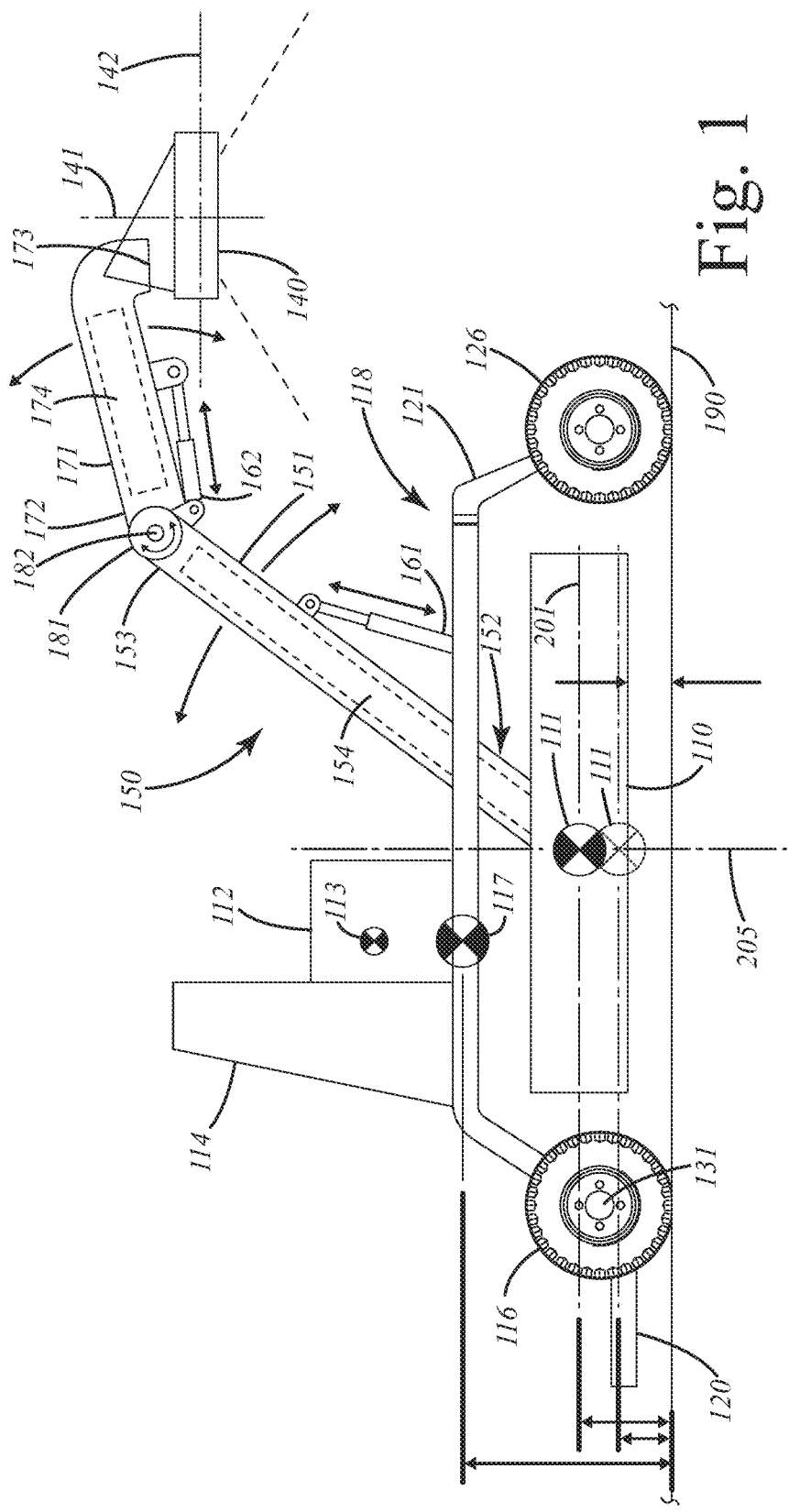
FIG. 1 shows a representative side view of a vehicle in accordance with one embodiment.

A system and method in accordance with one embodiment are provided in a vehicle in the form of a material spreader capable of distributing material over a ground surface. As an example, the material spreader may distribute granular materials, such as fertilizer, over the ground surface. The material spreader may include a material holder having a center of mass that is low to the ground surface, lowering the overall center of mass of the material spreader and providing enhanced stability for the material spreader.

In one embodiment, the center of mass of the material holder may be low to the ground surface such that the center of mass of the material holder is closer to the ground surface than the center of mass of the material spreader. Additional or alternative non-limiting examples in which the center of mass of the material holder may be considered low include one or more of the following: 1) the center of mass of the material holder being below a chassis of the material spreader; 2) the center of mass of the material holder being closer to the ground surface than a rotational axis of one or more or all of the wheels; 3) the center of mass of the material holder being closer to the ground than a center of mass of a power source (e.g., a motor) of the material spreader; and 4) a clearance between the ground surface and the material holder sufficiently small to substantially prevent disposition of the material feed outlet for granular material on an underside of the material holder.

The material spreader in one embodiment may include a material distributor, and may include a material transfer system operably coupled to the material holder and the material distributor. The material transfer system may be capable of transferring material (e.g., granular material or liquid material) from the material holder to the material distributor. The material distributor may be height-adjustable to facilitate distribution of material over areas of varying sizes. For instance, the material distributor may be a broadcast spreader capable of distributing material over an area, the size of which may be based at least in part on the rotational speed of the broadcast spreader and a height of the broadcast spreader.

The material transfer system in one embodiment may include an auger adapted to transfer material from the material holder to the material distributor. The material transfer system may include one or more tubes and one or more pivot points to facilitate height adjustment of the material distributor.

I. Overview of the Vehicle

The vehicle 100 in accordance with one embodiment may include a frame 121 or primary chassis. The frame 121 may support one or more components of the vehicle 100, including, for example, the power source 112 and a material holder 110. The vehicle 100 may include at least two traction wheels 116 (e.g., a left wheel and a right wheel) further supported by the frame 121 and configured to drive the vehicle in a forward or reverse direction. In the illustrated embodiment, the vehicle 100 further includes at least two ground-contacting wheels 126 (e.g., one left wheel and one right wheel) that may stabilize the vehicle 100 or facilitate distributing the weight of the vehicle 100 over the ground in conjunction with the at least two traction wheels 116. For instance, the at least two traction wheels 116 and the at least two ground-contacting wheels 126 may be disposed respectively in one of four quadrants defined as rear-left, rear-right, forward-left, and forward-right quadrants with the center of mass 117 of the vehicle 100 being the origin. In this arrangement, the at least two traction wheels 116 and the at least two ground-contacting wheels 126 may distribute the load or weight of the vehicle 100 over the ground, thereby stabilizing the vehicle 100. The at least two ground-contacting wheels 126 in one embodiment may be castor-type wheels that enable zero turning radius (ZTR) capability. It is to be understood that the number of traction wheels 116 (e.g., drive wheels) and the number of ground-contacting wheels 126 may vary depending on the application. For instance, the vehicle 100 may include a single ground-contacting wheel 126 or more than two ground-contacting wheels 126.

The at least two traction wheels 116 may be operably coupled to the power source 112 via one or more hydrostatic transmissions, which in conjunction with the power source 112 define a drive system for the vehicle 100. Each of the hydrostatic transmissions may include a pump coupled to the power source 112 and a hydrostatic transaxle capable of independently driving an axle of the at least two traction wheels 116 in forward or reverse directions, and at varying speeds. It should be understood that any type of drive system may be utilized, including, for example, a single dual axle hydrostatic transaxle.

The frame 121 of the vehicle 100 may include a front suspension 118 configured to support the at least two ground-contacting wheels 126 near the front of the vehicle 100. The front suspension 118 may include a front frame element 122 fixedly coupled to the main body of the frame 121, and may include forward control arms 124 that are movably coupled to the front frame element 122. Each end of the forward control arms 124 may support one of the at least two ground-contacting wheels 126. In the illustrated embodiment of FIG. 2, mounting between the forward control arms 124 and the front frame element 122 is facilitated by a joint 125 that enables the forward control arms 124 to rotate relative to the front frame element 122. The joint 125 may be disposed between left and right sides of the vehicle 100 such that the length of the forward control arms 124 is divided substantially evenly at the joint 125 between respective ground-contacting wheels 126. In this way, as the vehicle 100 approaches an uneven surface, the forward control arms 124 may tilt or rotate relative to the frame 121 to facilitate maintaining contact between the ground and at least two ground-contacting wheels 126.

The vehicle 100 may include a platform 120 (e.g., a riding platform) coupled to the frame 121, and arranged to enable an operator to stand while operating the vehicle 100. In the illustrated embodiment, the platform 120 is disposed near the rear of the vehicle 100. The platform 120 may be forward or aft of a rotational axis 131 of the rear-located traction wheels 116. It should be understood that the present disclosure is not limited to a platform 120 arranged to provide stand-up riding capabilities. For instance, the vehicle 100 may be a sit-down type vehicle such that the platform 120 is a seat for supporting the operator while operating the vehicle 100. The seat in such an embodiment may be disposed forward or aft of the power source 112.

In the illustrated embodiment, the vehicle 100 includes an operator control system 114 that provides one or more operator controls for the operator to direct operation of the vehicle 100. As an example, the operator control system 114 may include left and right levers that independently direct forward/reverse operation of respective left and right traction wheels 116. With such independent control over left and right traction wheels 116, the operator can drive the vehicle 100 forward, reverse, left, and right. The operator control system 114 may further include an ignition switch that controls ignition of the vehicle 100 and enablement of an electrical system. The operator control system 114 may be configured to enable/disable operation of the at least two traction wheels 116 based on presence of the operator, and may engage/disengage a brake based on presence of the operator.

II. Material Holder

The material holder 110 in the illustrated embodiment of FIG. 1 is provided with a center of mass 111 that is low in accordance with one or more embodiments described herein. For instance, the center of mass 111 of the material holder 110 may be considered low because the center of mass 111, with the material holder 110 being fully loaded, is below or closer to the ground surface 190 than the center of mass 117 of the vehicle 100. Having the center of mass 111 of the material holder 110 positioned low may enhance stability of the vehicle 100 relative to conventional configurations.

Figure 2:
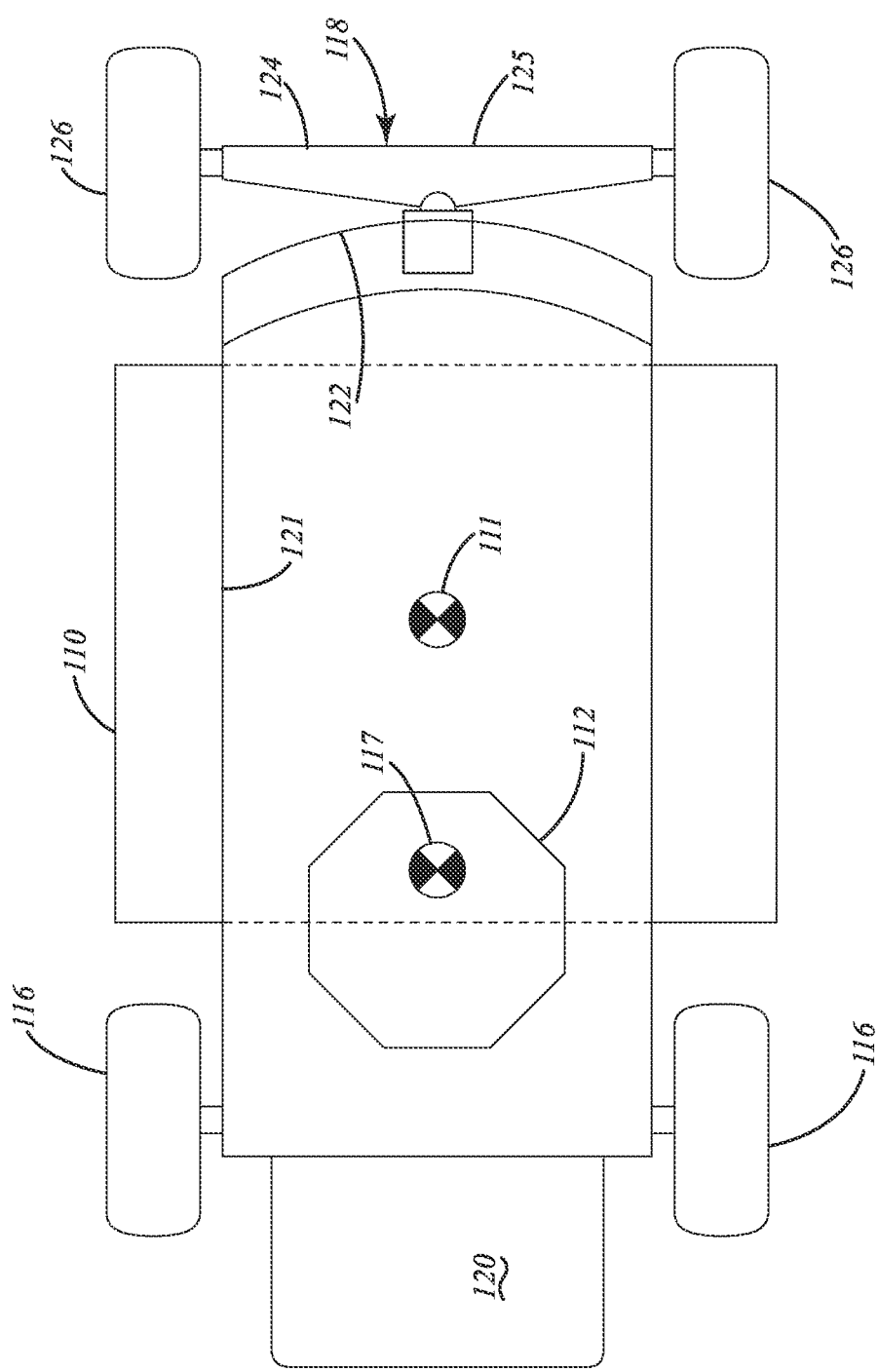
FIG. 2 shows a representative top view of a vehicle in accordance with one embodiment.

The material holder 110 in the illustrated embodiment of FIGS. 1-2 and 4 may include a longitudinal axis 201 and a lateral axis 203. The material holder 110 may be configured such that the center of mass 111 is disposed at or near the intersection between the longitudinal axis 201 and the lateral axis 203. For instance, the material holder 110 may include a granular material holder 202 that is centered relative to the longitudinal axis 201 and the lateral axis 203 such that regardless of the amount of material in the granular material holder 202, the center of mass 111 of the material holder 110 remains substantially in the same position with respect to the longitudinal axis 201 and the lateral axis 203.

The material holder 110 in the illustrated embodiments may include a vertical axis 205. The center of mass 111 of the material holder 110 may change relative to the vertical axis 205 based on the amount of mass being held and the level of the mass within the material holder 110 (e.g., based on the distribution of the mass within the material holder 110). For example, the center of mass 111 of the material holder 110 may be closer to the ground surface 190 in a partially full condition relative to a full condition. As described herein, the center of mass 111 of the material holder 110 may be low in accordance with a variety of criterion (e.g., lower than the center of mass 117 of the vehicle 100 or lower than a rotational axis 131 of a traction wheel 116, or both). The center of mass 111 of the material holder 110 may satisfy one or more of these criterion in a full condition, a partial fill condition, an empty condition, or any combination thereof.

Example non-limiting criteria include 1) center of mass 111 of the material holder 110 being low to the ground surface such that the center of mass 111 of the material holder 110 is closer to the ground surface 190 than the center of mass 117 of the vehicle 100, the center of mass 111 of the material holder 110 being below a central portion of the frame 121 of the vehicle 100; 2) the center of mass 111 of the material holder 110 being closer to the ground surface 190 than a rotational axis 131 of one or more or all of the wheels, as shown in FIG. 1 with the center of mass 111 depicted in dashed lines; 3) the center of mass 111 of the material holder 110 being closer the ground surface 190 than a center of mass 113 of the power source 112 of the vehicle 100; and 4) a clearance between the ground surface 190 and the material holder 110 being sufficiently small to substantially prevent disposition of material feed outlet for granular material on an underside of the material holder 110.

Optionally, as depicted in the illustrated embodiment of FIG. 4, the material holder 110 may be capable of holding more than one type of material. For instance, the material holder 110 may include a liquid material holder, which in the illustrated embodiment is provided in the form of first and second liquid material holders 204A-B disposed laterally with respect to the granular material holder 202 and substantially symmetrically with respect to the longitudinal axis 201. The first and second liquid material holders 204A-B may be fluidly coupled so that the level of liquid material within the first and second liquid material holders 204A-B is substantially the same, substantially maintaining a position of the center of mass 111 of the material holder 110 relative to the longitudinal axis 201 and the lateral axis 203 regardless of the level of liquid material within the first and second liquid material holders 204A-B.

An alternative embodiment of the material holder is shown in FIG. 3 and designated 110'. The material holder 110' may be similar in several respects to the material holder 110, including a longitudinal axis 201' and a lateral axis 203'. The material holder 110' may include a center of mass 111' disposed relative to the longitudinal axis 201' and the lateral axis 203' in accordance one or more embodiments described herein.

For instance, in the illustrated embodiment of FIG. 4, the material holder 110' includes a granular material holder 202' disposed adjacent to a liquid material holder 204', where the granular material holder 202' and the liquid material holder 204' are disposed on opposite sides of the longitudinal axis 201'. Depending on changes in the relative mass in the granular material holder 204' and the liquid material holder 204', the center of mass 111' may shift along the lateral axis 111'. The center of mass 111' in the illustrated embodiment may remain in substantially the same position along the longitudinal axis 201' despite changes in the amount of mass in the granular material holder 202' and the liquid material holder 204'.

In an alternative embodiment, the material holder 110' may include the granular material holder 202' and liquid material holder 204' disposed adjacent to each other and disposed in a stacked relationship such that the liquid material holder 204' is below the granular material holder 202' relative to a vertical axis of the material holder 110'.

It should be understood that although the granular material holder 202, 202' and the liquid material holder 204A-B, 204' are described respectively in conjunction holding granular material and liquid material, the present disclosure is not so limited. Any type of material may be held in these holders. The material holder 110, 110' may be configured to hold a single type of material or may include multiple material holders, each capable of holding a different type of material.

III. Material Distributor

In the illustrated embodiment of FIG. 1, a material distributor 140 may be provided that is capable of receiving material transferred from the material holder 110 via the material transfer system 150, and distributing received material over the ground surface 190. The material distributor 140 may be capable of distributing more than one type of material, such as both liquid material and granular material, or first and second types of granular materials.

In one embodiment, the material distributor 140 may include a broadcast spreader capable of rotating an impeller to throw material in circumferentially, fully or partially, about a vertical axis 141 of the material distributor 140. One or more baffles may be provided, optionally remotely controllable, to control the distribution of material about the vertical axis 141—e.g., the baffle may block distribution of material for a region of the broadcast spreader to prevent distribution of material in a corresponding direction relative to the vertical axis 141.

In one embodiment, the material distributor 140 may be coupled to the material transfer system 150, which may be capable of movement to adjust a height of the material distributor 140 relative to the ground surface 190. The coupling between the material distributor 140 and the material transfer system 150 may be rigid or allow for rotation of the material distributor 140 relative to the material transfer system 150. The coupling and/or the material transfer system 150 may be configured to maintain a position of a distribution plane 142 associated with the material distributor 140 as the material distributor 140 is raised or lowered.

The distribution plane 142 may correspond to a plane normal to the vertical axis 141 of the material distributor 140.

In one embodiment, the material distributor 140 may optionally include a secondary holder (not shown) capable of storing material to be distributed. The secondary holder may provide a buffer for distribution of material transferred via the material transfer system 150. The secondary holder may be integral to the material distributor 140; however, the present disclosure is not so limited. For instance, the secondary holder may be separate from the material distributor 140 and part of the material transfer system 150, such that the material transfer system 150 includes more than one stage of material transfer: 1) from the material holder 110 to the secondary holder and 2) from the secondary holder to the material distributor 140. Further holders or buffers for material in addition to the secondary holder may be provided in one or more embodiments.

IV. Material Transfer System

In the illustrated embodiment of FIG. 1, the material transfer system 150 of the vehicle 100 is shown.

The material transfer system 150 in the illustrated embodiment includes a first tube 151 having a first end 152 operably disposed to receive material from the material holder 110. The first tube 151 may include a first auger 154 disposed within the first tube 151 and capable of transferring material from the first end 152, disposed within the material holder 110 and operably coupled to the material held within the material holder 110 to transfer such material, through the first tube 151 toward the second end 153 of the first tube 151. The first tube 151 may be rotated relative to the material holder 110 via extension and retraction of a first actuator 161 coupled between the frame 121 and the first tube 151. Extension of the first actuator 161 may cause the second end 153 of the first tube 151 to rise, thereby resulting in a rise of the material distributor 140.

The first auger 154 in the illustrated embodiment is shown extending along the length of the first tube 151. The first auger 154 may optionally extend along a partial length of the first tube 151.

The material transfer system 150 in the illustrated embodiment includes a second tube 171 having a first end 172 operably disposed to receive material output from the second end 153 of the first tube 151. The second tube 171 may include a second end 173 operable to deliver material directly to the material distributor 140. The second end 173 may be directed downward toward the ground surface 190 such that gravity facilitates delivery of material to the material distributor 140. The second tube 171 may optionally include a second auger 174 operable to facilitate transfer of material along the second tube 171 from the first end 172 to the second end 173.

In the illustrated embodiment, the second tube 171 is rotatable about a rotation axis 182 by extension and retraction of a second actuator 162. Rotation of the second tube 171 may facilitate adjusting the height of the material distributor 140 in accordance with one or more embodiments described herein.

In the illustrated embodiment of FIG. 1, the material transfer system 150 includes a joint 181 configured to couple the first tube 151 to the second tube 171. The joint 181 in the illustrated embodiment is a swivel joint capable of enabling rotation about at least one axis, such as the rotation axis 182 designated in the illustrated embodiment. The swivel joint may be configured to allow rotation about one or more additional axes, such as an axis perpendicular to both the rotation axis 182 and a longitudinal axis of the first tube 151.

A secondary holder in accordance with one embodiment may be provided as part of the joint 181.

Figure 5:
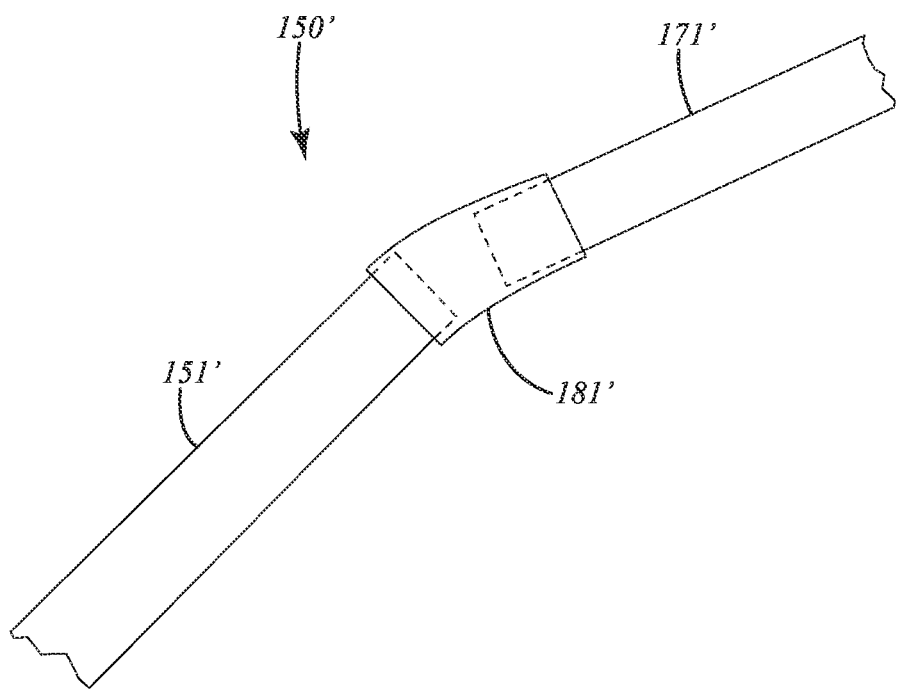
FIG. 5 shows a partial view of a material transfer system in accordance with one embodiment.

The joint 181 is not limited to a swivel type joint depicted in the illustrated embodiment of FIG. 1. Any type of joint may be provided. For instance, the joint may take the form a flexible coupler 181' shown in the illustrated embodiment of FIG. 5 in conjunction with first and second tubes 151', 171', which are provided in a material transfer system 150' similar to the material transfer system 150. The flexible coupler 181' in one embodiment may be polymer-based flexible coupling.

Figure 6:
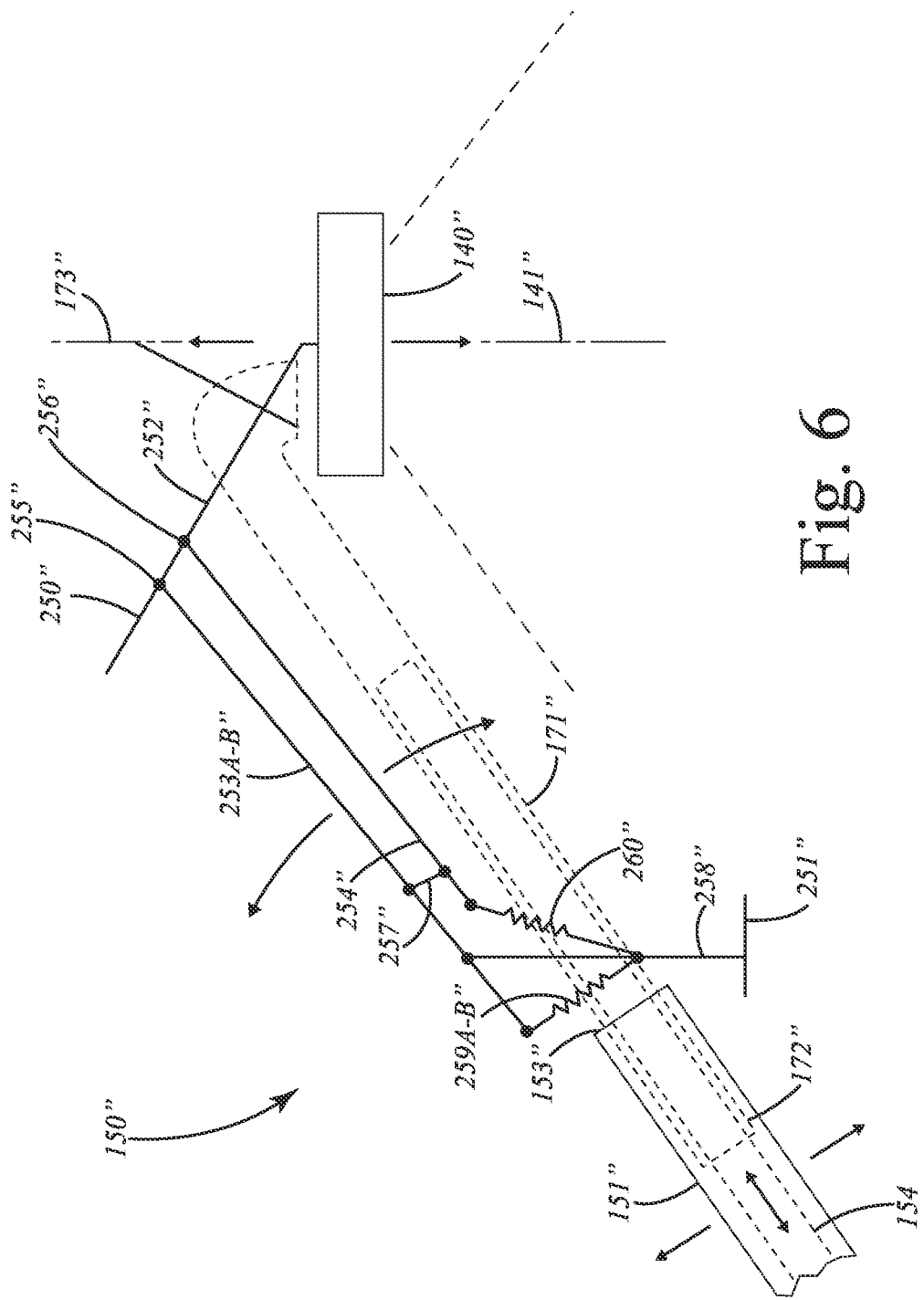
FIG. 6 shows a partial view of a material transfer system in accordance with one embodiment.

An alternative embodiment of the material transfer system is shown in the illustrated embodiment of FIG. 6 and generally designated 150". The material transfer system 150" is similar to the material transfer system 150 with several exceptions. For instance, the material transfer system 150" may include first and second tubes 151", 171" operable to facilitate transference of material from the material holder 110 to a material distributor 140".

The first tube may include a first end (not shown) operable to receive material from the material holder 110 and a second end 153" opposite the first end. The second tube 171" in the illustrated embodiment may be disposed at least partially within the first tube 151", with the first end 172" of the second tube 171" being disposed within the first tube 151". In one embodiment, to facilitate rotation of the first and second tubes 151", 171" relative to the first end of the first tube 151" and a transfer support 250", the second tube 171" may be slidable received within the first tube 151".

The transfer support 250" may be provided in a type of balanced arm construction capable of allowing a height adjustment of the material distributor 140". Optionally, the transfer support 250" may facilitate height adjustment of the material distributor 140" without changing a position of a vertical axis 141" of the material distributor 140" relative to the ground surface.

The transfer support 250" may include a top arm 252" coupled to the second tube 171" proximal to the second end 173". The top arm 252" may be coupled to first and second side arms 253A-B" and a back arm 254" via first and second elbows 255", 256". The back arm 254" may be coupled to the first and second side arms 253A-B" via a linkage 257". A base 251" of the transfer support 250" may be coupled to the frame 121 of the vehicle 100.

The first and second side arms 253A-B" may be coupled to and pivot relative to a riser 258" extending from the base 251". The first and second side arms 253A-B" may be respectively coupled to the riser 258 via first and second support restraints 259A-B" (e.g., first and second springs). The back arm 254" may also be coupled to the riser 258" via a back arm restraint 260" (e.g., a restraint). The first and second restraints 253A-B" and the back arm restraint 260" may aid in stabilizing a position of the top arm 252", while also allowing rotation of the top arm 252" relative the second elbow 256" associated with the back arm 252". The balanced arm arrangement of the transfer support 250" may facilitate stabilizing a position of the material distributor 140" over a variety of heights, high and low, without significant force from an actuator. Such an actuator may be similar to the first actuator 161 described herein; although, in an alternative embodiment, the actuator may be coupled between the transfer support 250" (rather than the first or second tubes 151", 171") and the frame 121.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A material spreader for distributing material over a ground surface, the material spreader comprising:
    a frame coupled to a riding platform adapted to support a user;
    a plurality of wheels coupled to the frame, the plurality of wheels including a left rear traction wheel and a right rear traction wheel coupled to a rearward portion of the frame and operable to move the material spreader along the ground surface, the plurality of wheels including a left front wheel and a right front wheel coupled to a forward portion of the frame;
    a power source having an output shaft operable to transmit power to at least one of the two traction wheels;
    a material holder capable of storing the material, the material holder having a center of mass that is disposed between the forward portion and the rearward portion of the frame, the center of mass of the material holder being closer to the ground surface than a center of mass of the material spreader;
    a material distributor operably coupled to the material holder, the material distributor being operable to direct the material toward the ground surface, the material distributor including a height adjuster operable to adjust a height of the material distributor to facilitate adjusting a distribution area of the material; and
    a material transfer system operably coupled to the material holder and the material distributor, the material transfer system configured to transfer the material from the material holder to the material distributor, wherein the material transfer system includes a first tube and a first auger within the first tube, wherein a first end of the first tube is operably disposed to receive material from the material holder, and wherein the first auger is operable to direct material from the material holder via the first end of the first tube toward a second end of the first tube.

2. The material spreader of claim 1 wherein the material holder is a hopper.

3. The material spreader of claim 1 wherein the center of mass of the material holder is closer to the ground surface than a rotational axis of the left rear traction wheel and the right rear traction wheel.

4. The material spreader of claim 1 wherein the center of mass of the material holder under a full condition is closer to the ground surface than the center of mass of the material spreader.

5. The material spreader of claim 1 wherein the material distributor is a broadcast spreader.

6. The material spreader of claim 5 wherein the broadcast spreader is operable to be raised from a low position to a high position and lowered from the high position to the low position via adjustment of the height of the material distributor, and wherein a rotational axis of the broadcast spreader is substantially perpendicular to the ground surface in both the high position and the low position.

7. The material spreader of claim 1 wherein the second end of the first tube is operable to provide material to the material distributor.

8. The material spreader of claim 1 wherein the material transfer system includes a second tube having a first end and a second end, wherein the first end of the second tube is configured to receive material output from the second end of the first tube.

9. The material spreader of claim 8 wherein a second auger is provided within the second tube.

10. The material spreader of claim 9 wherein the first and second tubes are coupled to each other via a tube joint.

11. The material spreader of claim 10, wherein the tube joint is a flexible tube.

12. The material spreader of claim 10 wherein the tube joint includes at least one swivel tube joint, wherein the at least one swivel tube joint is capable of allowing rotation in at least one axis of rotation.

13. The material spreader of claim 8 wherein the second end of the second tube is operable to provide material directly to the material distributor.

* * * * *